Dec. 28, 1948.　　　　P. L. WIGTON　　　　2,457,191
SEDIMENTATION APPARATUS
Filed Oct. 26, 1943　　　　　　　　　　　3 Sheets-Sheet 1
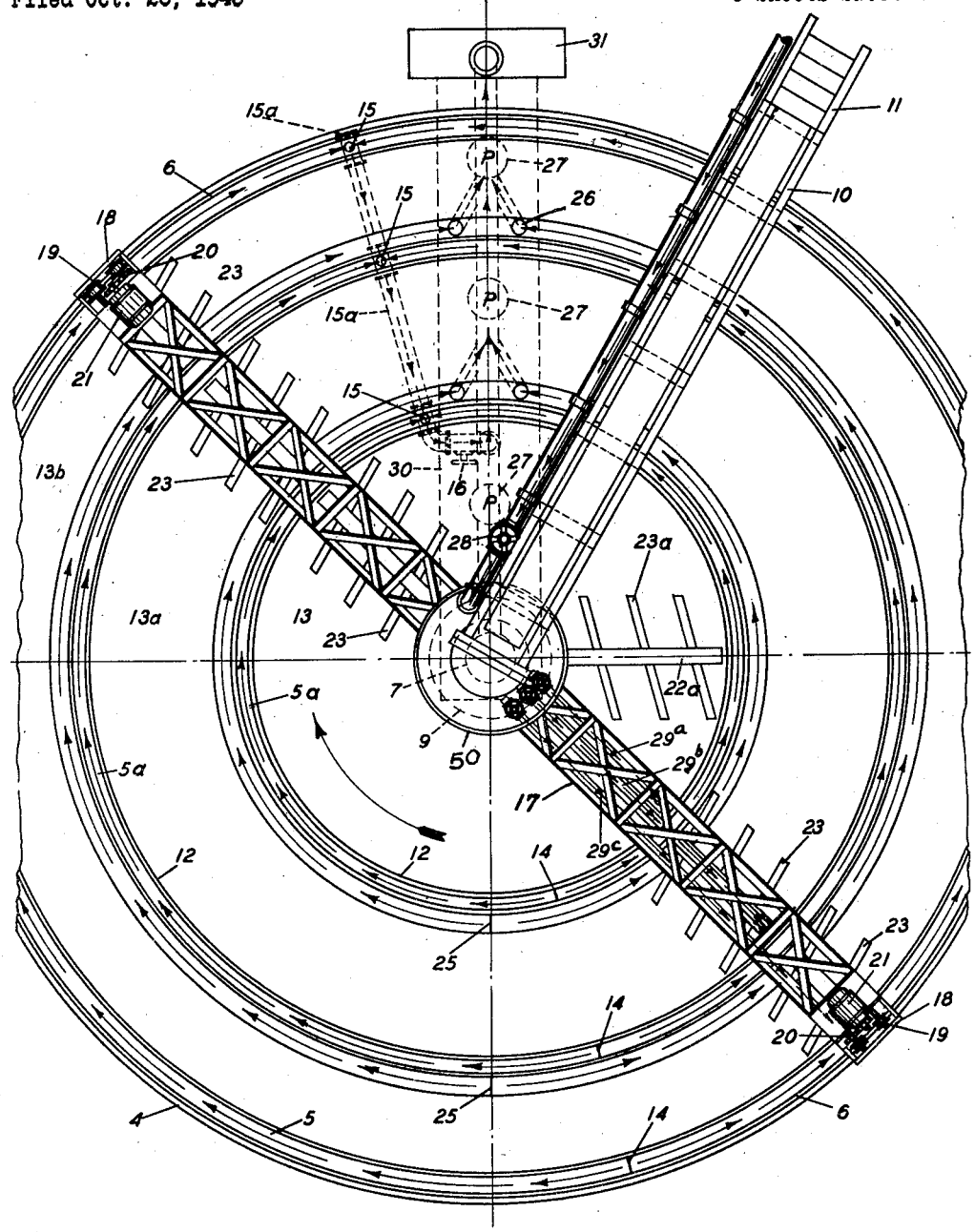
Fig.-1-
PAUL L. WIGTON
INVENTOR.
BY
ATTORNEY.

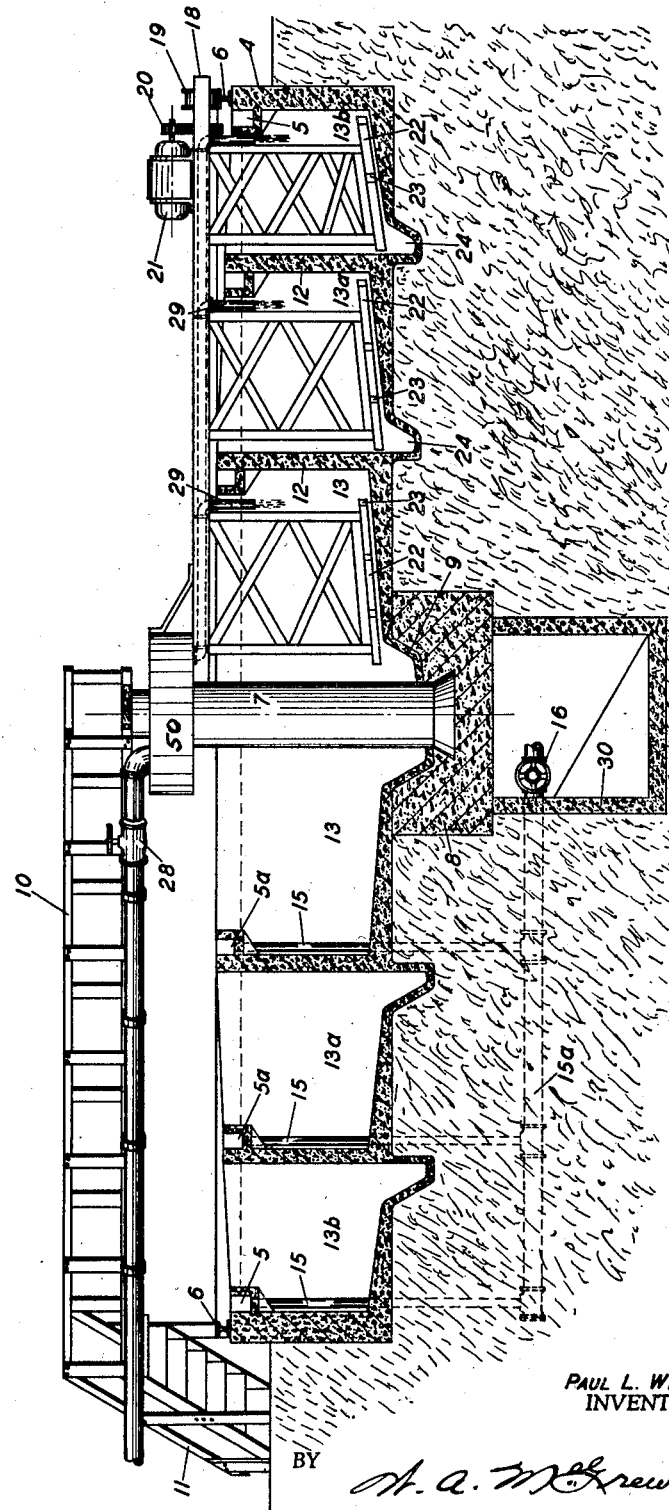

Dec. 28, 1948.   P. L. WIGTON   2,457,191
SEDIMENTATION APPARATUS
Filed Oct. 26, 1943   3 Sheets-Sheet 3
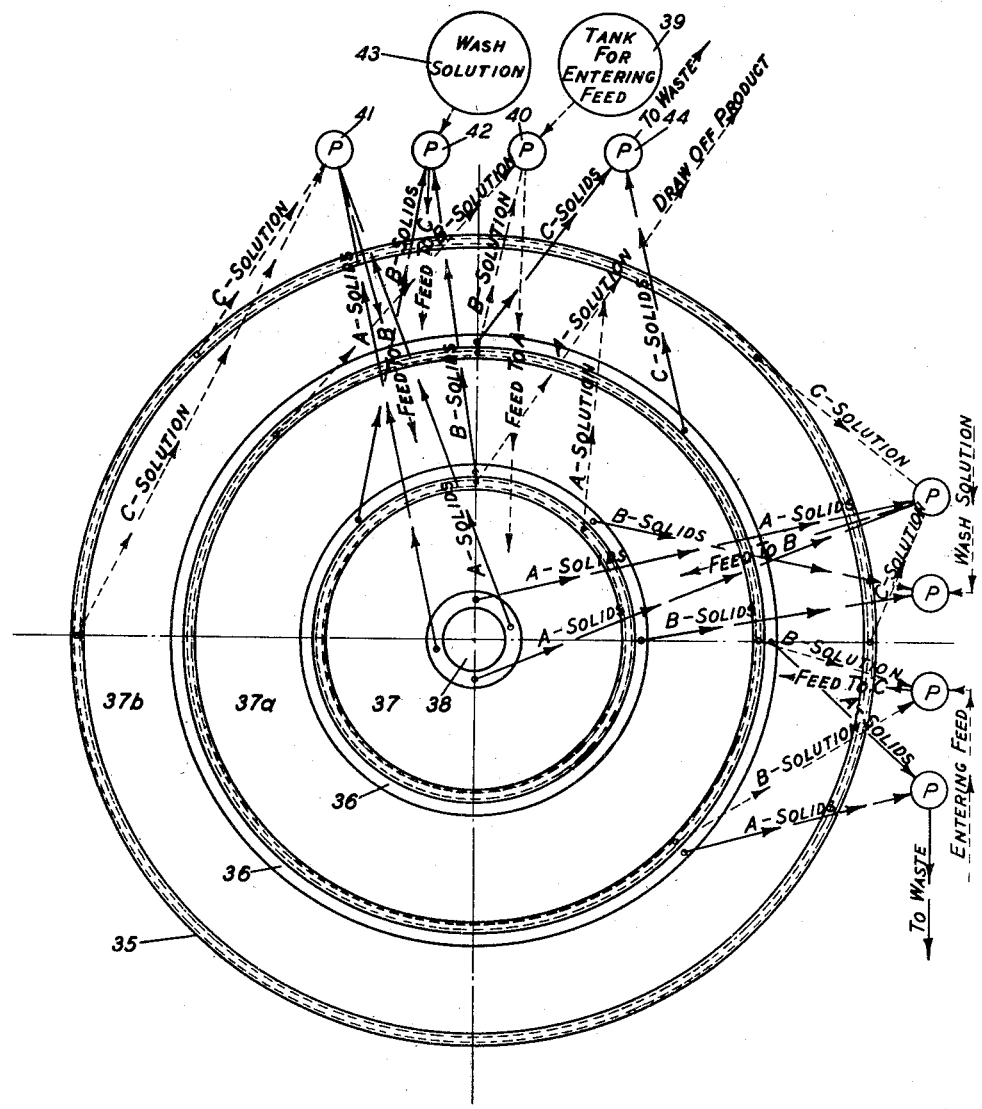
FIG.-3-
PAUL L. WIGTON
INVENTOR.
BY *H. A. McGrew*
ATTORNEY.

Patented Dec. 28, 1948

2,457,191

UNITED STATES PATENT OFFICE 2,457,191

SEDIMENTATION APPARATUS

Paul L. Wigton, Denver, Colo.

Application October 26, 1943, Serial No. 507,695

20 Claims. (Cl. 210—55)

1

This invention relates to thickener apparatus and more particularly relates to traction-type thickeners, as well as to thickeners of the type that have a plurality of treatment compartments in a single tank.

In many industrial, chemical and metallurgical treatments it is necessary to settle the solids content of liquid-solids intermixtures preparatory to washing off slimes or obtaining a clean separation of the liquid from the solids. The settled matter or sludge is conveniently produced by inducing quiescent settling of the solids in liquids in thickener apparatus. Where a relatively large volume of material is subjected to such treatment, the space requirements of the operation present many difficulties.

Rotary scrapers are employed in the thickeners to move the collecting sludge to a point of discharge, which usually is a central sump. In tank sizes up to about fifty feet in diameter the scrapers may be mounted on a central power-driven shaft with efficient results. However, when larger sized tanks are required, a traction type drive is utilized, with a track extending about the periphery of the tank, and the main truss of the scraper assembly driven by a self-propelled carriage traveling on said track.

In order to conserve floor space and to carry on certain types of countercurrent decantation, tray thickener apparatus is provided in which a tank is divided into a series of superposed compartments with the scrapers in each compartment mounted on a common central shaft in the tank. The load that can be carried and moved by such a shaft limits the maximum size of such tanks.

It is an object of the present invention to provide a traction-type thickener apparatus capable of performing the operations of tray thickeners in tanks exceeding the maximum size of tanks in which such operations heretofore have been performed.

Another object of the invention is to provide a traction-type thickener apparatus that has a plurality of separate treatment zones, each capable of functioning independently of the other of said zones.

A further object of the invention is to provide traction-type thickener apparatus in which countercurrent decantation and series washing may be performed.

Still another object of the invention is to provide in thickener apparatus a plurality of separate treatment zones permitting visible observation and individual regulation of each zone.

Other objects reside in novel details of construction and novel combinations and arrangements of parts, all of which will be described in the course of the following description.

The accompanying drawings illustrate typical embodiments of the invention. In the drawings, in the several views of which like parts have been designated similarly, Figure 1 is a fragmentary top plan view of thickener apparatus embodying features of the present invention;

Figure 2 is a vertical section through the tank of Figure 1 to more clearly illustrate the relation of parts said section being taken along radial lines adjacent the outlet pipe and one of the truss members; and Figure 3 is a diagrammatic representation of a modified type of thickener apparatus designed for countercurrent decantation treatments and embodying features of the present invention.

Referring first to the form of the invention illustrated in Figures 1 and 2, a tank 4 suitably supported by embedding in earth, but which may be supported on superstructure if desired, has near its top an overflow launder 5 and adjacent thereto on the rim of tank 4 a rail track 6 is disposed.

A central column 7 suitably supported on a foundation 8 extends upwardly through the tank to an elevation above the rim of the tank. At the base of column 7 a sump 9 is formed in foundation 8 to receive raked sludge. A catwalk 10 is supported by the top of column 7 at one of its ends and at its opposite end terminates in a stair support 11 disposed beyond the peripheral rim of tank 4.

The tank is divided by a series of annular upright walls 12 into a series of nested treatment compartments 13, 13a and 13b, and each of said walls is provided with an overflow launder 5a, generally similar to the tank overflow launder 5.

Preferably each of the launders 5 and 5a contains a partition 14 dividing its interior into two oppositely-extending segmental stretches. The bottom of each said launder inclines in opposite directions from a high point at the partition 14 to a lower point of discharge 15, here shown as vertical conduit connecting with a horizontal outlet pipe 15a beneath the tank and extending to the surface outside the tank where its discharge is controlled by a valve 16. These outlets function in the liquid discharge action to limit the extent of each said segmental stretch to approximately 180°.

A main truss 17 is journaled for rotation on column 7 and terminates at its outer end in a wheel-supported carriage 18 which travels on the annular track 6. The wheels 19 of the carriage are driven through the intermediary of suitable gearing 20 by a motor 21. If desired, the main truss may extend entirely across the tank, as illustrated in Figure 1, with a carriage support 18 at each end. In most cases, it will be preferable to have the main truss extend only halfway across the tank in the manner illustrated in Figure 2.

A scraper member 22 depends from the main truss in each of the compartments 13, 13a and 13b, and each such scraper carries a series of blades 23 adapted to move sludge in the tank progressively from an outer portion of each compartment toward the interior or center of the tank assembly.

The bottom of each of the compartments 13, 13a and 13b inclines downwardly from its outer wall toward its inner wall, and a sump 24 is provided in the bottom of compartments 13a and 13b which adjoins the inner wall of each said compartment. The sumps 24 have alined partitions 25, and these sumps incline from a high point at each side of said partitions to a low point substantially 180° therefrom where outlets 26 are disposed for removal of the sludge. Pumps 27 effect the sludge removal through outlets 26.

Feed to the tank is supplied by a valve-controlled conduit or header 28 supported from catwalk 10 and connected with a suitable source of supply (not shown). This header discharges into a rotary well 50 mounted near the top of column 7 and a plurality of valve-controlled conduits 29a, 29b and 29c, preferably provided with submerged outlets 29, are carried on truss 17 and discharge the feed into the compartments 13, 13a and 13b near the outer peripheral wall of each compartment. In this way, uniform feed distribution throughout each compartment is attained.

By reason of the present arrangement, each of the compartments is capable of functioning as a separate entity with feed delivered to same in a controlled volume, and the overflow of clarified solution and the discharge of sludge being independent of conditions in the other compartments. In the usual operation of the tank, all of the compartments will be operated simultaneously and the feed will be so distributed that substantially the same conditions as to volume, density and the like will prevail in each compartment. The compartments are open for visual inspection at all times and being subject to individual regulation, any change in the condition of the material under treatment will be readily noted and corrected rapidly.

If it becomes necessary to stop the operation in any one of the compartments, the feed can be made to bypass such compartment without impeding the operation in the other compartments. This is particularly important where clean-out operations are resorted to from time to time, as one compartment can be drained and cleaned while the other compartments continue to function in the regular way.

For most purposes, it will be desirable to have the volume of each compartment substantially the same, and where this practice is adopted the width of the compartments will decrease progressively from the center outward. The drawings illustrate a three-compartment arrangement, but it will be understood that this number may be varied as desired, to provide more or less compartments as required for a given treatment.

Another feature has been illustrated in Figure 1 which is important in the present design. The volume of material being contacted at any given moment by the rakes is considerably greater in compartment 13 than in the other compartments. Also, due to its more compact design, the depth of the sludge bed being acted on by the rakes may be greater than in the other compartments. For this reason, it will be advantageous to provide a second scraper member 22a carrying blades 23a similar to those hereinbefore described, and such member will be disposed out of alinement with but connected to the main truss section to provide a succession of scraping movements in each half revolution.

From the foregoing it will be apparent that the present design provides a relatively large treatment capacity in a tank occupying a limited area, and also permits the utilization of traction-type mechanism in a tank having the volumetric capacity of a tray thickener. The apparatus has the further advantage of providing individual control of the several compartments, with each one operating independently of the others whenever required to do so.

When the tank is embedded in earth as illustrated in Figure 2, the usual tunnel arrangement will be utilized to provide access to the conduits, valves and pumps. Such a tunnel has been illustrated at 30 in Figures 1 and 2 and will have the usual entrance 31, as shown in Figure 1.

The present design is also adapted for countercurrent decantation operations and such an arrangement has been illustrated more or less diagrammatically in Figure 3. The tank 35 in this form is divided by a series of annular walls 36 into a series of treatment compartments 37, 37a and 37b. A central column 38 in compartment 37 supports the catwalk and main truss section in the manner hereinbefore described. Each of the compartments 37, 37a and 37b will be provided with overflow launders similar to the launders 5 and 5a hereinbefore described, and the bottom of each compartment will be inclined and provided with a sump corresponding to the sumps 9 and 24 previously described.

Instead of discharging the clarified solution collecting in the overflows from the tank, a recirculation system is utilized with the clarified solution from compartment 37 being discharged from the tank as the final product. Similarly, the sludge collected in each of the compartments is recirculated with the exception of the sludge from compartment 37b which is discharged from the tank as a waste product.

To effect this circulation a storage tank 39 supplies the solids to be washed to a pump 40 which also draws in clarified solution collected in compartment 37a and mixes said products and discharges the intermixture as the feed to compartment 37. The sludge collecting in compartment 37 is drawn off by pumps 41, which also draw off the clarified solution from compartment 37b and mix the same with the intermixture discharged as the feed to compartment 37a. The solids collecting in compartment 37a are drawn off by another pump 42 and mixed with a wash solution supplied from a stock tank 43 and this intermixture is discharged as the feed to compartment 37b.

Preferably, a plurality of outlets will be provided in both the overflow launders and in the sumps, and each pumping unit will be connected with at least two sump outlets or two launder outlets in the manner indicated diagrammatically in Figure 3.

In operation, the wash solution from tank 43 is introduced into compartment 37b after intermixture with solids from the compartment 37a. The clarified solution from the compartment 37b mixes with solids drawn off from compartment 37 and this intermixture constitutes the feed to compartment 37a. Thus it will be observed that there is a progressive movement of solution through the respective treatment zones from the outermost to the innermost, with the clarified pregnant solution from this compartment being withdrawn from the treatment as the final product.

In the same action the solids are introduced first into the innermost compartment and are then moved progressively to the outermost, from which they are withdrawn by a pump 44 as a final waste product. This succession of mixing and washing actions serves to repeatedly subject the particle surfaces to the influence of the liquid, affording ample time for the dissolution of soluble constituents and effectively removing adhering matter from the surfaces of the individual particles as well as releasing entrained liquids from particle masses.

Due to the fact that each mixing operation is subjected to the control of individual pumping units such as adjustable stroke diaphragm pumps, for example, a close control of the countercurrent decantation can be had at each stage of the operation, and by having open tanks in which to perform the treatment, the operator is not only able to observe the condition of the material at the mixing stage, but also in the several separation zones, and thus can control density and other factors in a precise manner.

While the preferred arrangement for countercurrent decantation operations is the form illustrated in Fig. 3, a reverse arrangement in which incoming feed is first introduced into the outermost compartment and the collected sludge is moved progressively through the compartments to the innermost, while solution is passed through the succession of compartments in counter-current relation, is satisfactory for most purposes.

The arrangements of parts illustrated in the drawings are intended merely as typical embodiments of the invention which may be varied substantially within the spirit and scope of the invention. For example, in both Figs. 1 and 3, three-compartment tanks have been illustrated, but any plurality from two to as many as seven or more may be used according to the requirements of a given operation.

In addition, certain of the feeding and discharge features disclosed herein are applicable to traction-type thickeners, irrespective of whether or not they employ a plural compartment design. Such discharge arrangement may involve outlets arranged at 90° or 120° intervals in place of the 180° interval arrangement illustrated in Fig. 1.

Also, with respect to the arrangement of the solution discharge shown in Fig. 1, the conduits 15a may be directed into the tunnel 30 and valves 16 will be located therein to permit individual regulation of the discharge from the respective compartments. This arrangement will be particularly desirable in certain chemical treatments, where the solution from compartment 13 will be a different composition than the solution from compartment 13a, for example.

Similarly if it is desired, the scraping action may be reversed and the sludge discharge may be located in the outer portion of each compartment with the tank bottom sloping downwardly from the inner portion toward the outer portion. Also, wherever desired, auxiliary scrapers of the type shown in compartment 13, Fig. 1, may be used in any of the compartments. In particular, when tanks of relatively large size are employed, it may be advantageous to employ auxiliary scrapers in the outer compartments and subject the sludge bed to a plurality of scraping actions in each revolution of the motive mechanism.

Under some conditions, it also will be desirable to employ sump scrapers. Due to the arrangement of the partitions 14, this involves a complication in that a scraper that would be effective at one end of a given sump, would not clear the partition member at the opposite end of such sump. Where such scrapers are to be used, it is proposed to mount rails on the tops of the partition walls 12 and have such rails incline and decline at the points where the partitions 14 are located. The sump scraper elements will be carried by the truss member, but will be mounted thereon for up and down movement initiated by a wheel-supporting member traveling on the track on said partitions 12.

By a proper variation in the elevation of the track with respect to the contour of an associated sump, it is possible to shift the position of the scraper at each stage of the revolution so that it is operating efficiently and still avoids contact with the partitions 14 where these occur.

In the treatment of certain materials a more uniform sludge discharge will be obtained if the feed to a given compartment is introduced immediately above the sump in which the sludge collects. By employing the movable feed arrangement, it is possible to discharge the feed on the same side of the compartment as the sump and still obtain a substantially uniform feed distribution about the circumferential extent of the sump.

The aforementioned combinations and arrangements of parts are intended merely as typical examples of the practice of the present invention, and various changes and modifications may be availed of within the spirit and scope of the invention as defined in the hereunto appended claims.

What I claim and desire to secure by Letters Patent is:

1. In sedimentation apparatus, a tank, at least one partition dividing said tank into a plurality of concentric treatment compartments located within common horizontal planes, means for overflowing clarified liquid separately from each compartment, a rotary truss member mounted for movement around the plurality of compartments, means for rotating the truss member, scrapers carried by said truss member and extending into each said compartment to move settled solids to a point of discharge therein, and means distant from the clarified liquid overflow for delivering material to be treated to the plurality of compartments independently of each other.

2. In sedimentation apparatus, a tank, at least one partition dividing said tank into a plurality of concentric treatment compartments located within common horizontal planes, means for overflowing clarified liquid separately from each compartment, a rotary truss member mounted for movement around the plurality of compartments, means for rotating the truss member, scrapers carried by said truss member and extending into each said compartment to move settled solids to a point of discharge therein, and means for delivering material to be treated to the plurality of compartments independently of each other.

3. In sedimentation apparatus, a tank, at least one partition dividing said tank into a plurality of concentric treatment compartments located within common horizontal planes, means for overflowing clarified liquid separately from each compartment, a rotary truss member mounted for movement around the plurality of compartments, means for rotating the truss member, scrapers carried by said truss member and extending into each said compartment to move settled solids to a point of discharge therein, and rotary conductive means for delivering material to be treated to the plurality of compartments independently of each other and in spaced relation to the clarified liquid overflow.

4. In sedimentation apparatus, a tank, at least one partition dividing said tank into a plurality of concentric treatment compartments located within common horizontal planes, means for overflowing clarified liquid separately from each compartment, a rotary truss member mounted for movement around the plurality of compartments, means for rotating the truss member, scrapers carried by said truss member and extending into each said compartment to move settled solids to a point of discharge therein, a plurality of conduit members mounted on the truss member for conjoint rotation therewith, with each conduit having a discharge outlet in a different compartment of the plurality and spaced from the clarified liquid overflow, and supply means for delivering feed to the respective conduits.

5. In sedimentation apparatus, a tank, at least one partition dividing said tank into a plurality of concentric treatment compartments located within common horizontal planes, a rotary truss member mounted for movement around the plurality of compartments, means for rotating the truss member, scrapers carried by said truss member and extending into each said compartment to move settled solids to a point of discharge therein, a plurality of conduit members mounted on the truss member for conjoint rotation therewith, with each conduit having such extension as to provide a submerged discharge outlet in a different compartment of the plurality, supply means for delivering feed to the respective conduits, and means for overflowing clarified liquid from each compartment.

6. In sedimentation apparatus, a tank, at least one partition dividing said tank into a plurality of concentric treatment compartments located within common horizontal planes, means for overflowing clarified liquid separately from each compartment, a rotary truss member mounted for movement around the plurality of compartments, means for rotating the truss member, scrapers carried by said truss member and extending into each said compartment to move settled solids to a point of discharge therein, a plurality of valve-controlled conduit members mounted on the truss member for conjoint rotation therewith, with each conduit having a discharge outlet in a different compartment of the plurality and spaced from the clarified liquid overflow, and supply means for delivering feed to the respective conduits.

7. Sedimentation apparatus, comprising a tank, at least one partition dividing said tank into a plurality of nested treatment compartments, a sump in each compartment having a sloping bottom and a discharge outlet at the low point thereof, means for withdrawing sludge from each said sump, an overflow launder for clarified liquid in the upper portion of each compartment, conduit means for removing clarified liquid from said launders, a rotary truss member mounted for movement around the plurality of compartments, means for rotating the truss member, scrapers carried by said truss member and extending into each said compartment to move settled solids into the respective sumps, and means for delivering material to be treated to the plurality of compartments at points spaced from the overflow launders.

8. Sedimentation apparatus, comprising a tank, at least one partition dividing said tank into a plurality of nested treatment compartments, a sump in each compartment having a sloping bottom and a discharge outlet at the low point thereof, means for withdrawing sludge from each said sump, an overflow launder for clarified liquid in the upper portion of each compartment, conduit means for removing clarified liquid from said launders, a rotary truss member mounted for movement around the plurality of compartments, means for rotating the truss member, scrapers carried by said truss member and extending into each said compartment to move settled solids into the respective sumps, and rotary conductive means for delivering material to be treated to the plurality of compartments at points spaced from the overflow launders.

9. Sedimentation apparatus, comprising a tank, at least one partition dividing said tank into a plurality of nested treatment compartments, a sump in each compartment having a sloping bottom, a wall member dividing at least one said sump into a plurality of segmental channels, means for withdrawing sludge from the respective sumps and channels at a plurality of points, an overflow launder for clarified liquid in the upper portion of each compartment, conduit means for removing clarified liquid from said launders at a plurality of points, a rotary truss member mounted for movement around the plurality of compartments, means for rotating the truss member, scrapers carried by said truss members and extending into each said compartment to move settled solids into the respective sumps, and means for delivering material to be treated to the plurality of compartments at points spaced from the overflow launders.

10. Countercurrent decantation apparatus, comprising a tank divided into at least three settling compartments in nested arrangement having their upper bounderies arranged to prevent overflow, each said compartment having a sludge-collecting sump portion and an upper overflow launder for collecting clarified liquid, means for delivering incoming feed and a wash solution in separate streams to different compartments of the tank, and means including conduits and pumps so arranged as to move collected sludge and solution out of and into the tank in countercurrent flows through the succession of compartments, with one such flow progressing from the innermost to the outermost of said compartments and the other such flow progressing from the outermost to the innermost of said compartments.

11. Countercurrent decantation apparatus, comprising a tank divided into at least three settling compartments in nested arrangement having their upper boundaries arranged to prevent overflow, each said compartment having a sludge-collecting sump portion and an upper overflow launder for collecting clarified liquid, means for delivering incoming feed and a wash solution in separate streams to different compartments of the tank, and means including conduits and pumps so arranged as to move collected sludge and solution out of and into the tank in countercurrent flows through the succession of compartments, with one such flow progressing from the innermost to the outermost of said compartments and the other such flow progressing from the outermost to the innermost of said compartments, said conduits and pumps being arranged to deliver to at least one of said compartments a mixture of sludge collected from a second said compartment with clarified solution drawn from a third said compartment.

12. Countercurrent decantation apparatus, comprising a tank divided into at least three settling compartments in nested arrangement having their upper boundaries arranged to prevent overflow, each said compartment having a sludge-collecting sump portion and an upper overflow launder for collecting clarified liquid, means for delivering incoming feed to the innermost of said compartments, means for delivering a wash solution to the outermost of said compartments, and means, including conduits and pumps so arranged as to move collected sludge out of and into the tank progressively through the succession of compartments from the innermost to the outermost, and for moving solution out of and into the tank progressively through said succession of compartments countercurrent to said sludge movement.

13. Countercurrent decantation apparatus, comprising a tank divided into at least three settling compartments in nested arrangement having their upper boundaries arranged to prevent overflow, each said compartment having a sludge-collecting sump portion and an upper overflow launder for collecting clarified liquid, means for delivering incoming feed to the innermost of said compartments, means for delivering a wash solution to the outermost of said compartments, means, including conduits and pumps so arranged as to move collected sludge out of and into the tank progressively through the succession of compartments from the innermost to the outermost, and for moving solution out of and into the tank progressively through said succession of compartments countercurrent to said sludge movement, and means in said distributing system positioned outside the tank for mixing collected sludge from one compartment with solution prior to delivery of the intermixture as the feed to another of said compartments.

14. Countercurrent decantation apparatus, comprising a tank divided into at least three settling compartments in nested arrangement having their upper boundaries arranged to prevent overflow, each said compartment having a sludge-collecting sump portion and an upper overflow launder for collecting clarified liquid, means for delivering incoming feed to the innermost of said compartments, means for delivering a wash solution to the outermost of said compartments, means, including conduits and pumps so arranged as to move collected sludge out of and into the tank progressively through the succession of compartments from the innermost to the outermost, and for moving solution out of and into the tank progressively through said succession of compartments countercurrent to said sludge movement, and means associated with certain conduits and pumps outside the tank for mixing a fluent solids body with clarified solution drawn from one compartment prior to introducing the intermixture as the feed to another said compartment.

15. Sedimentation apparatus, comprising a tank, at least one partition dividing said tank into a plurality of nested treatment compartments, a rotary truss member mounted for movement around the plurality of compartments, means for rotating the truss member, scrapers carried by said truss member and extending into each said compartment to move settled solids to a point of discharge therein, means for feeding material to be clarified to each compartment at a point spaced from the point of clarified solution withdrawal, means for withdrawing clarified solution from the upper portion of each compartment, and means for removing settled sludge moved to the point of discharge in each said compartment by said scrapers.

16. Sedimentation apparatus, comprising a tank, at least one partition dividing said tank into a plurality of nested treatment compartments, a rotary truss member mounted for movement around the plurality of compartments, means for rotating the truss member, scrapers carried by said truss member and extending into each said compartment to move settled solids to a point of discharge therein, means rotatable with the truss member for feeding material to be clarified to each compartment at a point spaced from the point of clarified solution withdrawal, means for withdrawing clarified solution from the upper portion of each compartment, and means for removing settled sludge moved to the point of discharge in each said compartment by said scraper.

17. In sedimentation apparatus, a tank, at least one partition dividing said tank into a plurality of nested treatment compartments, means for overflowing clarified liquid separately from each compartment, a rotary truss member mounted for movement around the plurality of compartments, means for rotating the truss member, scrapers carried by said truss member and extending into each said compartment to move settled solids to a point of discharge therein, and means for delivering material to be treated to the plurality of compartments at points spaced from the clarified liquid overflow.

18. In sedimentation apparatus, inclusive of the treatment of a liquid-solids intermixture in a plurality of nested settling compartments, a truss member mounted for rotation around said plurality of nested compartments, means for rotating the truss member, scrapers carried on said truss member and extending into the respective compartments to move sludge forming therein from an outer portion toward an inner portion, and feed distributing means mounted for conjoint rotation with the truss and having a discharge outlet at each said outer portion of the respective compartments.

19. In sedimentation apparatus, inclusive of the treatment of a liquid-solids intermixture in a plurality of nested settling compartments, a truss member mounted for rotation around said plurality of nested compartments, means for rotating the truss member, scrapers carried on said truss member and extending into the respective compartments to move sludge forming therein from an outer portion toward an inner portion, and feed distributing means mounted for conjoint rotation with the truss and having a submerged discharge outlet at each said outer portion of the respective compartments.

20. In sedimentation apparatus, a tank, at least one partition dividing said tank into a plurality of treatment compartments of different widths, means for overflowing clarified liquid separately from each compartment, a rotary truss member mounted for movement around the plurality of compartments, means for rotating the truss member, scrapers carried by said member and extending into each compartment to move settled solids to a point of discharge therein, and means for delivering material to be treated to the plurality of compartments at points spaced from the clarified liquid overflow means.

PAUL L. WIGTON.

REFERENCES CITED

The following references are of record in the file of this patent:

UNITED STATES PATENTS

| Number | Name | Date |
|---|---|---|
| 499,583 | Powers | June 13, 1893 |
| 584,736 | Goodhue | June 15, 1897 |
| 1,534,145 | Stedman | Apr. 21, 1925 |
| 1,739,302 | Gregorich | Dec. 10, 1929 |
| 1,995,224 | Pruss | Mar. 19, 1935 |
| 2,110,462 | Coberly | Mar. 8, 1938 |
| 2,129,181 | Morse | Sept. 6, 1938 |
| 2,134,113 | Ehle | Oct. 25, 1938 |
| 2,160,838 | Dorr | June 6, 1939 |
| 2,233,619 | Linch | Mar. 4, 1941 |
| 2,233,641 | Ramsey | Mar. 4, 1941 |
| 2,239,604 | Harms | Apr. 22, 1941 |
| 2,257,362 | Zitkowski | Sept. 30, 1941 |
| 2,263,167 | Dorr et al. | Nov. 18, 1941 |
| 2,267,516 | Adams | Dec. 23, 1941 |
| 2,274,361 | Darby | Feb. 24, 1942 |
| 2,291,772 | Talbot et al. | Aug. 4, 1942 |
| 2,344,355 | Harms | Mar. 14, 1944 |
| 2,355,760 | Trebler | Aug. 15, 1944 |